United States Patent
Fujii et al.

[11] Patent Number: 6,138,191
[45] Date of Patent: Oct. 24, 2000

[54] APPARATUS FOR SELECTIVELY OPERATING A PLURALITY OF COMPUTERS

[75] Inventors: Kenichi Fujii; Yuji Arai; Takashi Matsui, all of Matto, Japan

[73] Assignee: Nanao Corporation, Matto, Japan

[21] Appl. No.: 09/021,171

[22] Filed: Feb. 10, 1998

[30] Foreign Application Priority Data

Feb. 12, 1997 [JP] Japan .................................... 9-28216

[51] Int. Cl.⁷ .................................................. G06F 13/00
[52] U.S. Cl. ............................ 710/73; 345/1; 340/825.5
[58] Field of Search .............................. 709/244; 700/17, 700/83, 84, 85; 345/1, 168, 326, 507; 340/825, 825.03, 825.05; 307/44; 710/73

[56] References Cited

U.S. PATENT DOCUMENTS

| | | | |
|---|---|---|---|
| 4,404,551 | 9/1983 | Howse et al. ................................ | 341/1 |
| 5,227,666 | 7/1993 | Asprey ........................................ | 307/44 |
| 5,261,079 | 11/1993 | Celi, Jr. . | |
| 5,499,377 | 3/1996 | Lee .......................................... | 709/244 |

FOREIGN PATENT DOCUMENTS

| | | |
|---|---|---|
| 92 03 884 | 9/1992 | Germany . |
| 63-165914 | 7/1988 | Japan . |
| 4-86932 | 7/1992 | Japan . |
| 5-53710 | 3/1993 | Japan . |
| 5-80909 | 4/1993 | Japan . |
| 3005222 | 10/1994 | Japan . |
| 6-324780 | 11/1994 | Japan . |
| 3014537 | 6/1995 | Japan . |
| 9-282059 | 10/1997 | Japan . |
| 2 249 645 | 5/1992 | United Kingdom . |
| WO 89/11125 | 11/1989 | WIPO . |
| WO 93/07567 | 4/1993 | WIPO . |
| WO 94/19749 | 9/1994 | WIPO . |

OTHER PUBLICATIONS

Patent Abstracts of Japan, vol. 12, No. 97 (P–682), JP 62 231 369, Oct. 9, 1987.

*Primary Examiner*—Edwin C. Holloway, III
*Attorney, Agent, or Firm*—Oblon, Spivak, McClelland, Maier & Neustadt, P.C.

[57] ABSTRACT

An apparatus for selectively operating a plurality of computers connected to a common video monitor, includes a single data I/P device for inputting data and instructions to the plurality of computers, a main control circuit which is connected to the data I/P device, and a selection circuit for selectively providing the data and instructions from the data I/P device.

The main control circuit outputs a computer selection signal to select one of the plurality of computers to which the I/P data and instructions are to be transmitted and a video selection signal to select the video output of the selected computer to allow display on the common video monitor.

10 Claims, 2 Drawing Sheets

APPARATUS FOR SELECTIVELY OPERATING A PLURALITY OF COMPUTERS

BACKGROUND OF THE INVENTION AND RELATED ART STATEMENT

This invention relates to an apparatus for selectively operating a plurality of computers. More particularly, this invention relates to an apparatus which provides a comfortable working environment for a personal computer system in which an input (I/P) device and a video monitor are shared with the plurality of computers.

Nowadays it is becoming increasingly common among computer users to have a plurality of computers for a single work place; thus a shortage of space for the computers and the computer related equipment becomes one of the major obstacles to the arrangement.

The operation of the computer system, which includes a plurality of computers, would be improved if operations and functions of keyboards, which differ according to types of computers, are made uniform and a common video monitor is shared with the plurality of computers.

In order to realize the above idea, it has been proposed (for instance in Japanese Utility Model Publication No. 3005222) to provide a key-code converting unit having a key-code converter for making the input (I/P) data from the keyboard of one computer adaptable to another computer of different type in the system and a video selector for selectively inputting video signal from each computer to a common video monitor. More specifically, according to the device disclosed in the Japanese publication, the keyboard operations relating to computers of the different machine types are made uniform through the key-code converter, and the video signal from each of the computers is selectively displayed on the common video monitor through the video selector.

In the aforementioned device, it is required that each of a plurality of computers has its own I/P device connected thereto. This means that on the user's work desk, there are placed a plurality of computers and the same number of keyboards corresponding to each respective computers. When the user desires to select an operation of a particular one of the computers, he/she may simply select one of the keyboards corresponding to that particular computer. The spaces occupied by the set of I/P devices including a keyboard and a mouse is considerably large on the work desk in the ordinary office environment. For instance, if the user has two computers, he/she needs two sets of I/P devices. This means the two sets of I/P devices have to be placed on the work desk available to the user. In order to cope with this situation, some users stand or lean the keyboard (say, a $2^{nd}$ KB) not in use against the video monitor or the computer. When wishing to use the $2^{nd}$ KB, the current keyboard in use (say, a $1^{st}$ KB) must be moved to where it will not bother the operation of the $2^{nd}$ KB.

As a result, the user's operability of the computer system as a whole, especially on a narrow desk, is far from fully satisfactory.

SUMMARY OF THE INVENTION

It is therefore an object of this invention to solve the problems of the conventional device described in the foregoing section.

It is another object of this invention to provide an apparatus for selectively operating a plurality of computers with a single data I/P device such as a keyboard with a provision of a main control circuit and a selection circuit to realize an even more comfortable working environment in the office or in an office like space.

To fulfill the above objects according to this invention, an apparatus for selectively operating a plurality of computers connected to a common video monitor is provided which comprises a single data I/P device for inputting data and instructions to the plurality of computers, a main control circuit which is connected to the data I/P device, and a selection circuit for selectively providing the data and instructions from the data I/P device to one of the plurality of computers. The main control circuit, upon receipt of a switch-over instruction from the data I/P device, outputs a computer selection signal to select one of the plurality of computers to which the I/P data and instructions are to be transmitted and a video selection signal to select the video output of the selected one of the computers to allow display on the common video monitor.

In the thus constructed apparatus, the main control circuit generates a computer selection signal to the selection circuit and a video selection signal to the common video monitor according to the switch-over instruction from the data I/P device thereby enabling a selection of one computer from a plurality of computers, thus allowing normal operation of that computer. The selection circuit sends input data from the data I/P device to the selected computer in accordance with the computer selection signal from the main control circuit and the video monitor selects the video signal for that selected computer in accordance with the video selection signal, thus allowing the display of image information for the selected computer on the video monitor.

It should be noted that the data I/P device includes a keyboard and pointing devices such as a mouse, a track ball, a digitizer and the like.

Accordingly, the desk space required by the keyboard for a computer that is not being used is unnecessary and more space is available when the apparatus of this invention is used. Furthermore, as the best-accustomed keyboard and mouse can be used for the plurality of computers, it will enhance the operability of the plurality of computers. As a result, the working conditions with the use of plural computers become even more comfortable.

These and other objects, features and advantages of the present invention will become apparent upon reading the following detailed descriptions along with accompanying drawings.

DETAILED DESCRIPTION OF THE PREFERRED EMBODIMENT OF THE INVENTION

Hereinafter, an embodiment of this invention is described in reference with drawings.

Figure 1:
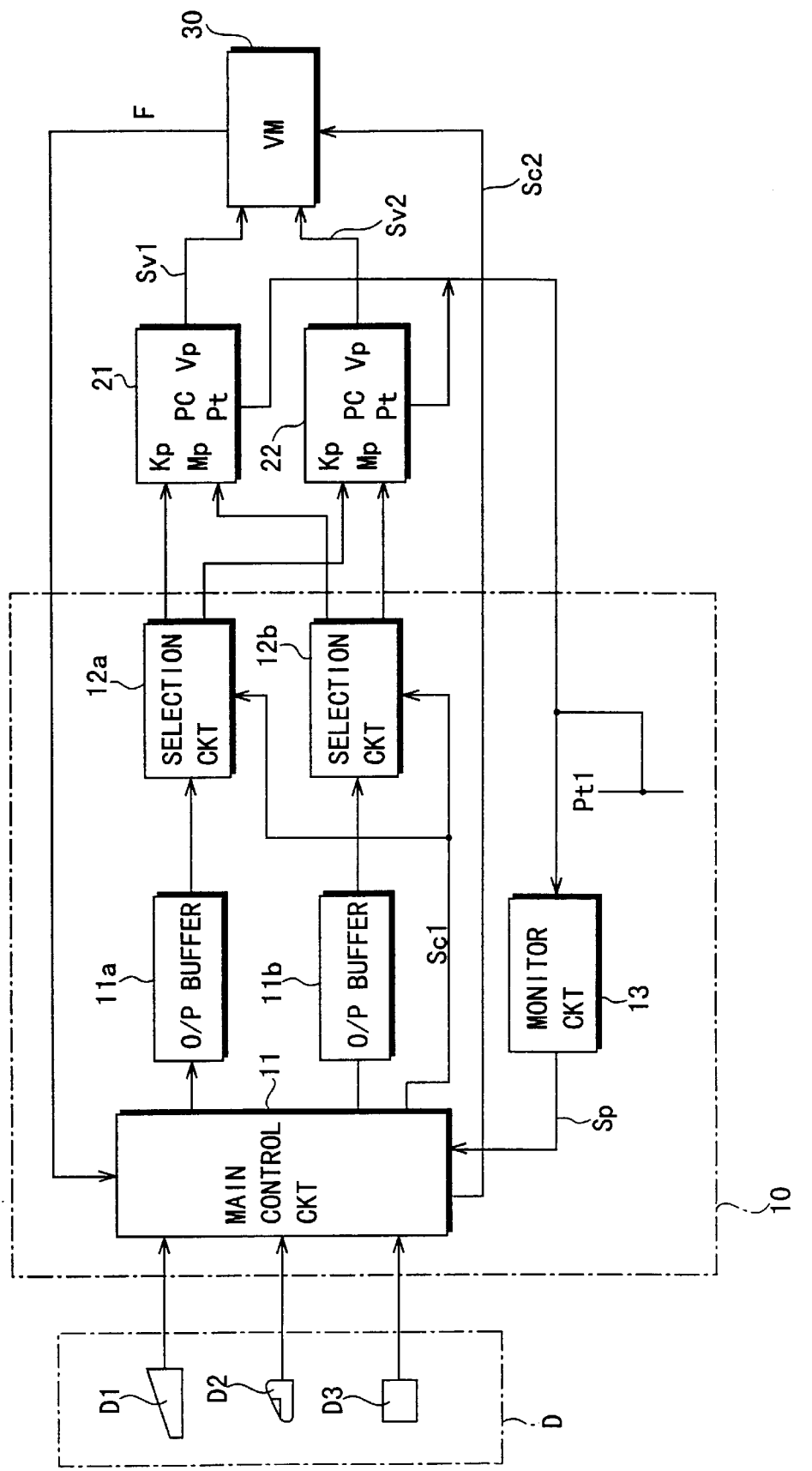
FIG. 1 is a block diagram showing the whole system as an application example of one embodiment of this invention.

Referring to FIG. 1, an apparatus 10 for selectively operating a plurality of computers (hereinafter referred to as a SE-OP apparatus 10) is shown. The SE-OP apparatus 10 has a main control circuit 11 and selection circuits 12a, 12b as its essential elements.

The main control circuit 11 is connected to a set of data I/P devices D (or simply referred to as a data I/P device) including a keyboard D1, a mouse D2, and a switch box D3. The output ports of the main control circuit 11 are connected to each of the selection circuits 12a, 12b via output buffers 11a, 11b respectively. A selection signal $S_{c1}$ from the main control circuit 11 is connected to the selection circuits 12a, 12b respectively. This signal, $S_{c1}$, indicates which computer the I/P data and the commands are directed to from the main control circuit 11. The output buffers 11a, 11b and selection circuits 12a, 12b are constructed such that they are adaptable to the keyboard D1 and the mouse D2.

It should be noted that provision of independent selection circuits 12a, 12b corresponding to the keyboard D1 and the mouse D2 respectively would enable independent data processing operation with respect to the keyboard D1 and the mouse D2, thus avoiding a possible drawback against high speed data processing operation in the likely case of the data forms for the keyboard D1 and the mouse D2 significantly differing from each other.

The output ports of the selection circuit 12a for the keyboard are connected to the keyboard ports $K_p$, $K_p$ of the two computers 21, 22 (shown in FIG. 1) respectively. The output ports of the selection circuit 12b for the mouse are connected to the mouse ports $M_p$, $M_p$ of the two computers 21, 22 respectively. Each of video output ports $V_p$, $V_p$ of two computers 21, 22 is connected to a common video monitor 30. In this case, it is assumed that the two computers 21, 22 are of the same machine type.

The switch box D3 directly outputs a selection signal for selecting the operation of one computer from a plurality of computers.

Power sources $P_t$, $P_t$ for the computers 21, 22 are connected to a power source line $P_{t1}$ of the SE-OP apparatus 10. The power source corresponding to the computer in ON state is supplied with power via this line. In other words, if the two computers are in ON state, both power sources $P_t$, $P_t$ are supplied with power from the power source line $P_{t1}$. In addition, the power sources $P_t$, $P_t$ are connected to an energized state monitoring circuit 13 (also referred to as an ON/OFF state monitoring circuit) which is set to input a start-up signal $S_p$ to the main control circuit 11. Thus this ON/OFF state monitoring circuit 13 monitors the states of power sources $P_t$, $P_t$ for the two computers 21, 22 to detect the ON/OFF state of the computers 21, 22.

With the ON/OFF state monitoring circuit 13, the main control circuit 11 may set the system to enable the data from the data I/P device D and the data displayed by the video monitor 30 with respect to one of the computers 21, 22 that has been first powered-up for effecting the normal operation thereof. Further, the monitor 13 continuously monitors the ON/OFF states of the computers 21, 22, thus when another computer's power-up is detected, the main control circuit 11 can be set to enable the normal operation of the most recent powered-up computer and stop operation of the first computer. The functions and effects of the ON/OFF state monitoring circuit 13 is to be discussed in more detail in the later section of this description.

The main control circuit 11 and the video monitor 30 are set to allow exchange of signal(s) between one another. Thus, when the main control circuit 11 transmits a selection signal $S_{c2}$ to the video monitor 30, the video monitor 30 returns selection information F (that indicates which one of the computers is currently selected and using the display) to the main control 11.

Figure 2:
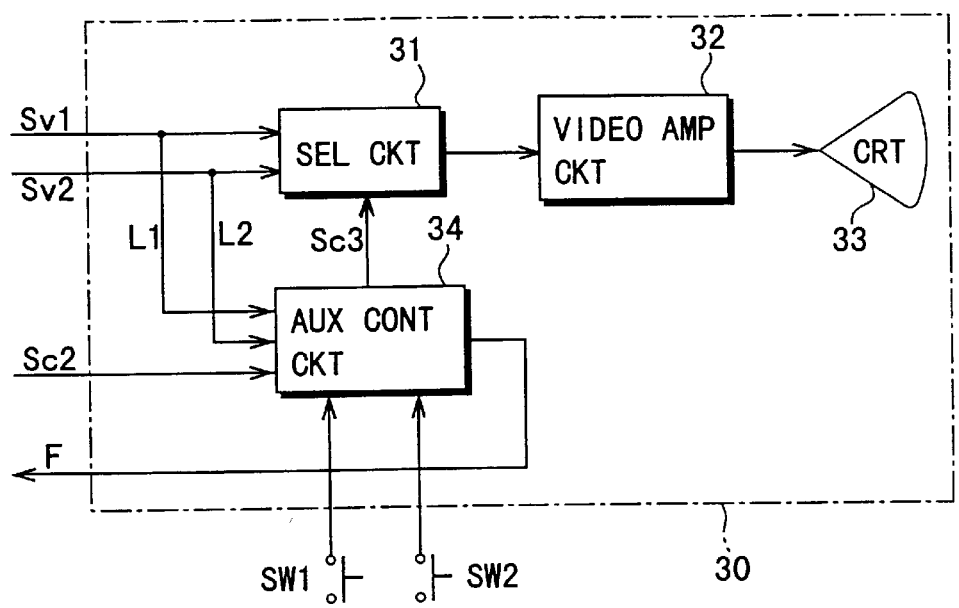
FIG. 2 is a block diagram for showing an essential portion of the FIG. 1.

Now referring to FIG. 2, each of the video signals $S_{v1}$, $S_{v2}$ from the respective video output ports $V_p$, $V_p$ of the computers 21, 22 is inputted to a selection circuit 31 in the video monitor 30. The output from the selection circuit 31 is sent to a color CRT 33 via a video amplifier circuit 32. It should be noted that although the color CRT 33 is used in this embodiment, the invention is not limited to CRT's only, a liquid crystal display panel, a plasma display panel and the like may also be used.

The video signals $S_{v1}$, $S_{v2}$ are transmitted to the auxiliary control circuit 34 via lines L1, L2 respectively. With this arrangement, the auxiliary control circuit 34 recognizes a presence or an absence of the video signals $S_{v1}$, $S_{v2}$. The auxiliary control circuit 34 outputs a video selection signal $S_{c3}$ to the selection circuit 31. In addition, the video selection signal $S_{c2}$ from the main control circuit 11 is sent to the auxiliary control circuit 34. The auxiliary control circuit 34 responds by outputting the selection information F (indicating which one of the computers is currently selected and using the display).

Furthermore, the auxiliary control circuit 34 is provided with a selection switch SW1 and a set switch SW2 for setting priority orders. Both switches SW1 and SW2 are described in more detail later.

The selection circuit 31 in the video monitor 30 selects one of the video signals $S_{v1}$, $S_{v2}$ in accordance with the selection signal $S_{c3}$ from the auxiliary control circuit 34 and transmits the selected video signal to the CRT 33 via the video amplifier circuit 32. In this way, the video monitor 30 selectively displays one image data signal from the computers 21, 22.

When particular priority orders are not set in the auxiliary control circuit 34, the auxiliary control circuit 34 sends a video selection signal $S_{c3}$ corresponding to one of the video signals $S_{v1}$, $S_{v2}$, whichever may be present at the selection circuit 31. If a new video signal is generated, a video selection signal $S_{c3}$ for selecting the new generated signal is produced.

When the particular priority orders regarding the video signals $S_{v1}$, $S_{v2}$ are set in the auxiliary control circuit 34 through set switch SW2 and should either one and one only of the video signals $S_{v1}$, $S_{v2}$ be present, the signal which is available will be selected. Only when both video signals are present, will the signal with the higher priority be selected.

The auxiliary control circuit 34 in this way selects one of the video signals, $S_{v1}$, $S_{v2}$, automatically and feed-backs the result of selection in the form of selection information (i.e., F=F1) to the main control circuit 11 in the SE-OP apparatus 10.

Moreover, when the selection switch SW1 is manually operated, the auxiliary control circuit 34 generates a new video selection signal $S_{c3}$ to enable a user to manually choose one of the video signals $S_{v1}$, $S_{v2}$ through the selection circuit 31. The auxiliary control circuit 34, when one of the video signals was chosen manually, feed-backs the result of selection in the form of manual selection information (i.e., F=F2) to the main control circuit 11 in the SE-OP apparatus 10.

Yet moreover the auxiliary control circuit 34 and the selection circuit 31 can select one of the video signals $S_{v1}$, $S_{v2}$ based on the video selection signal $S_{c2}$ sent from the main control circuit 11. Specifically, the auxiliary control circuit 34, when receiving the video selection signal $S_{c2}$, generates a new video selection signal $S_{c3}$ to the selection circuit 31 to select the signal indicated by the video selection signal $S_{c2}$.

Now, when either one of the computers 21, 22 is activated, the power source $P_t$ of the activated computer, say computer $2i$ (i=1,2), will allow a start-up of the SE-OP apparatus 10. The ON/OFF monitoring circuit 13 will then communicate to the main control circuit 11 and notify it of the activation of computer $2i$ with a start-up signal $S_p$. Thus, the main control circuit 11 recognizes the activation state of computer $2i$.

Subsequently, the main control circuit 11 generates a computer selection signal $S_{c1}$ to the selection circuits 12a, 12b so that the output ports communicate with the keyboard port $K_p$ and the mouse port $M_p$ of the activated computer $2i$. At the same time, the main control circuit 11 sends a video selection signal $S_{c2}$ to the video monitor 30 so that the video monitor 30 selects the video signal $S_{vi}$ (i=1,2) of the activated computer $2i$ through the selection circuit 31 and the auxiliary control circuit 34.

As a result, the I/P data through the I/P device D which includes the keyboard D1 and the mouse D2 is inputted to the keyboard port $K_p$ and the mouse port $M_p$ of the activated computer $2i$ through first the main control circuit 11, second the buffers 11a, 11b, and third the selection circuits 12a, 12b. The video monitor 30, upon receiving the video signal $Se_{vi}$ from the video output port $V_p$ of the activated computer 21, will display the image information from the computer $2i$. In other words, the main control circuit 11 sets the system which includes the data I/P device D and the video monitor 30, to operate with respect to the activated computer $2i$ and thus allow normal operation of the activated computer $2i$.

Thereafter, when the second computer, say computer $2j$ (j=2,1; i≠j) , is activated, the main control circuit 11 recognizes the activation of the second computer $2j$ by the signal $S_p$ from the ON/OFF state monitoring circuit 13. Subsequently, the main control circuit 11 sends a computer selection signal $S_{c1}$ to the selection circuits 12a, 12b and a video selection signal $S_{c2}$ to the video monitor 30 to make each output port of the selection circuits 12a, 12b communicate with the computer $2j$ and to make the video monitor 30 select the video selection signal $S_{vj}$ (j=2,1: j≠i) from the computer $2j$ through the selection circuit 31 thereby enabling the normal operation of the computer $2j$. When the power supply to the first activated computer $2i$ is shut down, the main control circuit 11 is set to continue communication with the second computer $2j$.

In addition, at the time the power is supplied to the computer $2i$ or $2j$, the main control circuit 11 outputs an emulation signal to the computers $2i$, $2j$ to conduct a pseudo-controlling of the keyboard D1. Hence, the computer $2i$ or $2j$ does not undergo malfunction although the keyboard D1 is not either mechanically or electrically connected to the computers $2i$, $2j$.

When the second computer $2j$ is activated following the activation of the first computer $2i$, the main control circuit 11 may not send the selection signals $S_{c1}$, $S_{c2}$ to allow continual operation of the computer $2i$. In this case, the main control circuit 11, upon receiving a signal indicating a power down state of computer $2i$ from the ON/OFF state monitoring circuit 13, will generate a computer selection signal $S_{c1}$ and a video selection signal $S_{c2}$ to effect the normal operation of the later activated computer $2j$.

The aforementioned arrangement, i.e., a continuation of operation state of the first activated computer even after the second computer is activated, would increase the operability of the system. For example, when the two computers $2i$, $2j$ are both activated, the later activated computer $2j$ may be promptly put into operation upon receiving a switch order from one of the elements of the data I/P device D. More specifically, the main control circuit 11 recognizes the generation of the switch-over signal for switching the operation of the computer when either one of the following occurs: (a) a particular key of the keyboard D1 is continuously pressed for a certain period of time; (b) the left and right buttons of the mouse D2 are pressed according to a certain sequence; or (c) a particular switch (not illustrated) of the switch box D3 is pressed. Upon recognizing the switch-over signal, the main control circuit 11 sends the selection signals $S_{c1}$, $S_{c2}$ to make the selection circuits 12a, 12b and the video monitor 30 communicate with the later activated computer $2j$ thereby enabling the normal operation of the computer $2j$ and stopping the operation of the first activated computer $2i$.

Accordingly, computers $2i$ and $2j$, one of which is in an operational state and the other a non-operational state, are being repeatedly controlled to switch operational state based on the switch-over signal from the data I/P device D.

Moreover, it may be possible to control the operational state (i.e., operable state or non-operable state) of the computers 21, 22 through the video monitor 30.

More specifically, when the selection switch SW1 of the video monitor 30 is used to select one of the video signals $S_{vi}$, the result of selection is sent to the main control circuit 11 as manual selection information, F=F2, sent by the video monitor 30. Then the main control circuit 11 generates a computer selection signal $S_{c1}$ and sends it to the selection circuits 12a, 12b so that the selection circuits 12a, 12b select the computer $2i$ corresponding to the manually selected video signal $S_{vi}$ at the video monitor 30.

Similarly, when the video signal $S_{vi}$ is automatically selected following the priority orders set by the set switch SW 2 at the video monitor 30, the main control circuit 11 recognizes this selection based on selection information, F=F1, sent by the video monitor 30. Then the main control circuit 11 generates and sends the computer selection signal $S_{c1}$ to the selection circuits 12a, 12b so that the selection circuits 12a, 12b select the computer $2i$ corresponding to the automatically selected video signal $S_{vi}$.

In this invention, the machine types include an IBM compatible type and/or Macintosh type. The machine type also refers to the operating system of the computer such as Windows 95 operating system type or Macintosh operating system type.

Figure 3:
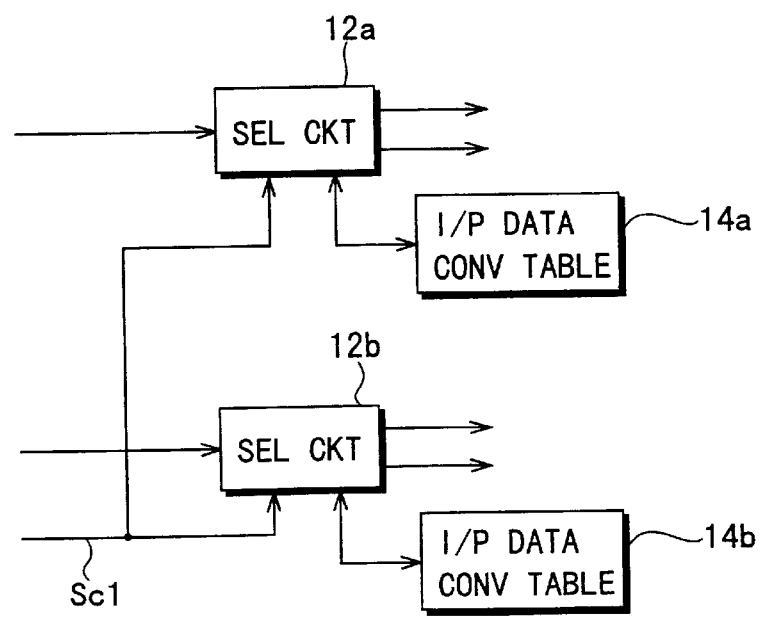
FIG. 3 is a block diagram showing another embodiment of this invention.

Another Embodiments:

Referring to FIG. 3, I/P data conversion tables 14a, 14b for the keyboard and the mouse may be provided in the selection circuits 12a, 12b respectively.

In the above provision, even when the computer 21 and the computer 22 are of different machine types from each other, adapting different codes corresponding to the I/P data through the keyboard D1 and the mouse D2, the I/P data from the keyboard D1 and the mouse D2 can be converted into the proper code forms, that are adaptable to either one of the computer $2i$ selected by the selection signal $S_{c1}$, with reference to the respective I/P data conversion tables 14a, 14b.

In the aforementioned descriptions, the buffers 11a, 11b, the selection circuits 12a, 12b, or the I/P data conversion tables 14a, 14b for keyboard output D1 and the mouse D2 may be respectively formed as a single unit as long as the required high speed response is achieved. Further, the number of computers in this system is not limited to two as in the aforementioned embodiments; it may be an arbitrary number more than two. In this case, however, the main control circuit 11 sets the data I/P device D and the video monitor 30 to communicate with one of the computers $2i$ (i=1,2, . . . , n) through the selection circuits 12a, 12b.

Although the present invention has been fully described by way of examples with reference to the accompanying drawings, it is understood that various changes and modifications will be apparent to those skilled in the art. Therefore, unless otherwise such changes and modifications depart from the scope of this invention as defined in the following section, they should be constructed as being included therein.

What is claimed is:

1. An apparatus for selectively operating a plurality of computers connected to a common video monitor, comprising:

a data input (I/P) device for inputting data and instructions to the plurality of computers;

a main control circuit which is connected to the data I/P device;

a selection circuit for selectively providing the data and instructions through the data I/P device to one of the plurality of computers, wherein the main control circuit, upon receipt of a switch-over instruction from the data I/P device outputs a computer selection signal to select one of the plurality of computers to which the data and instructions are to be transmitted and a video selection signal to select the video output of the selected one of the computers to allow display on the common video monitor; and an auxiliary control circuit, provided in the common video monitor, which is connected to the main control circuit for receiving the video signal from the main control circuit and for setting a priority order of the video selection signals issued from the main control circuit for controlling the display on the common video monitor.

2. The apparatus according to claim 1, wherein the main control circuit includes an energized state monitoring circuit for monitoring the ON/OFF state of each of the computers.

3. The apparatus according to claim 1, wherein the plurality of computers includes a Macintosh computer.

4. The apparatus according to claim 1, wherein the data I/P device includes a keyboard and a mouse and the selection circuit is individually provided to each of the keyboard and the mouse.

5. The apparatus according to claim 1, wherein the plurality of computers are different from each other in machine configuration and the selection circuit has an I/P data conversion table for converting data inputted with the data I/P device of a first format corresponding to one of the computers to a data of a second format corresponding to another one of the computers.

6. The apparatus according to claim 1, wherein the plurality of computers includes at least one IBM compatible computer.

7. The apparatus according to claim 6, wherein the plurality of computers includes a Macintosh computer.

8. The apparatus according to claim 1, further comprising a monitor circuit for monitoring an ON/OFF state of each of the plurality of the computers.

9. The apparatus according to claim 8, further comprising a manual selection switch for manually selecting one of the plurality of computers whose output to be displayed on the common video monitor when the monitor circuit monitors ON states of the plurality of computers.

10. The apparatus according to claim 8, further comprising a selection switch, connected to the auxiliary control circuit, for selecting said priority order of the video selection signals to place priority of the video output of the computers on the common video monitor.

* * * * *